UNITED STATES PATENT OFFICE.

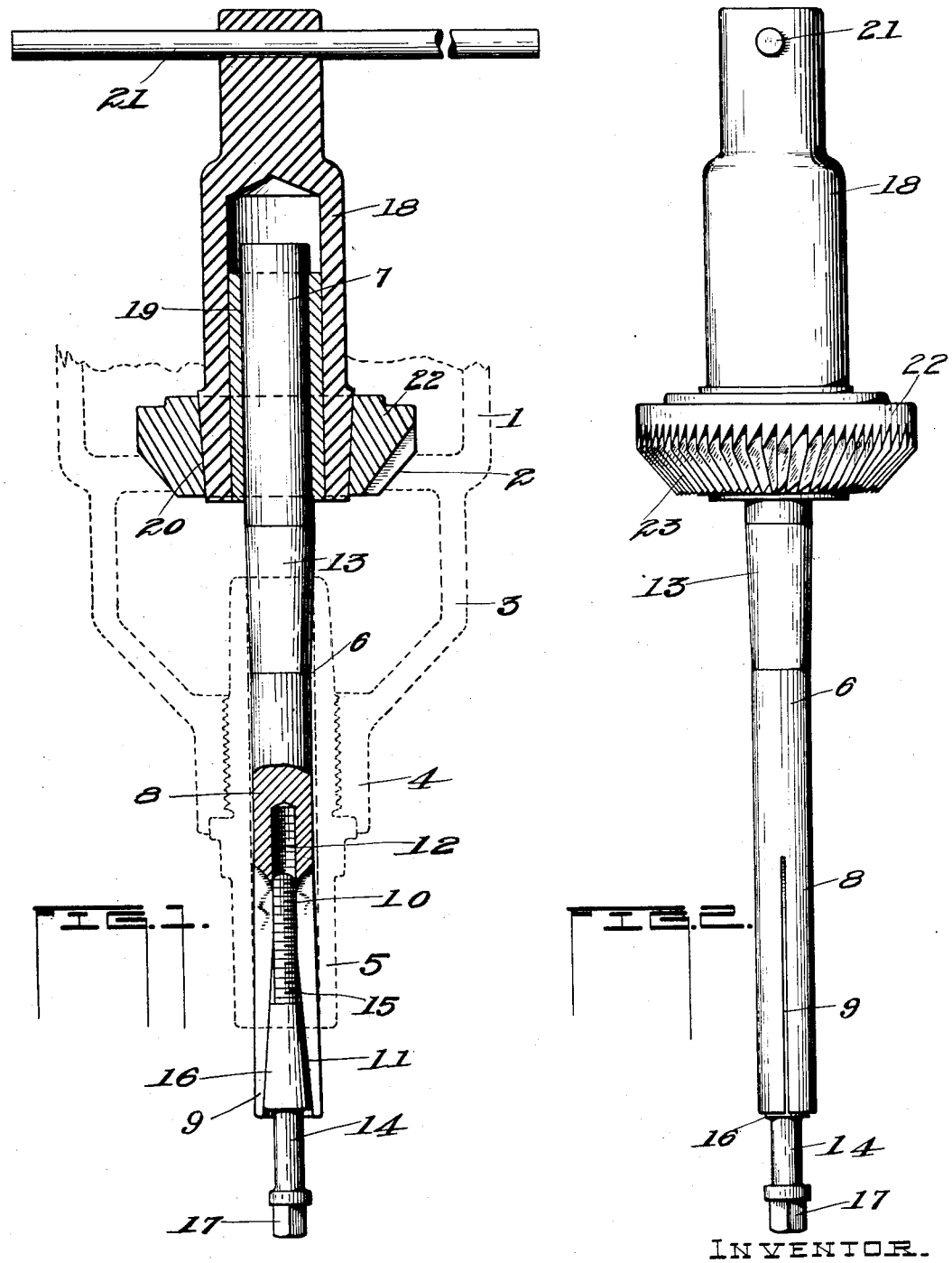

LESTER R. VAN VOLKENBURG, OF PEORIA, ILLINOIS, ASSIGNOR TO AVERY COMPANY, OF PEORIA, ILLINOIS, A CORPORATION OF ILLINOIS.

TOOL FOR REFACING VALVE-SEATS.

1,350,901.  Specification of Letters Patent.  Patented Aug. 24, 1920.

Application filed July 10, 1918. Serial No. 244,247.

*To all whom it may concern:*

Be it known that I, LESTER R. VAN VOLKENBURG, a citizen of the United States, a resident of Peoria, in the county of Peoria and State of Illinois, have invented new and useful Improvements in Tools for Refacing Valve-Seats, of which the following is a specification.

This invention has reference to tools for refacing the valve seats of engines.

One of the objects of the present invention is to provide a pilot member adapted to enter the valve stem guide, and formed with a tapered portion which will engage with the upper end of the guide and seat the pilot member therein; the lower end of the pilot member being preferably split four ways for a portion of its length and internally threaded, said internally threaded portion adapted to be engaged by an expansion screw for centering and securing the pilot member against rotation. The upper end of the pilot member serves as a journal on which the cutting tool is rotated for refacing the valve seat.

The invention has for a further object, a pilot member adapted to be secured against rotation within the valve stem guide for centering the pilot member, whereby it may serve as a journal on which is rotated the cutter for refacing the valve seat; said cutter being carried by a cutter holder journaled to rotate on the upper end of the pilot member.

A further object of the invention is to provide a cutter with an uneven number of cutting teeth, whereby "chattering" is prevented during the cutting operation.

That the invention may be fully understood, reference is had to the accompanying drawing, forming a part of the description, in which,—

Figure 1 is an elevation of the pilot member partly in section, to show how the same is secured within the valve stem guide, and the cutter holder and cutter journaled thereon, the latter being shown in cross-section; the parts of the engine necessary to show the application of the tool being shown in dotted lines; and Fig. 2 is an elevation of the complete tool.

Like characters of reference denote corresponding parts throughout the figures.

In the drawings, in dotted lines, there is shown part of a valve chamber casing designated 1, having the valve seat 2, and 3 designates the casing of what may be considered as the exhaust or intake chamber, having a neck portion 4, in which is screwed the valve stem guide 5. The axis of this guide is in axial alinement with the axis of the valve seat, and of the valve adapted to be seated therein, not shown.

Referring now to the tool for refacing the valve seat, 6 designates what I have chosen to call a pilot member. This member is provided with the upper journal portion 7 on which is adapted to rotate, the cutting tool. The lower end 8 of this member is slightly smaller in diameter than the upper journal portion 7, and is preferably split four ways, as at 9 for a portion of its length, and said portion 8 has the axially arranged opening 10, which for a portion of its length is tapered, as at 11, and the remainder thereof threaded, as at 12. The journal portion 7 is separated from the lower split portion 9 by the tapered portion 13.

14 designates an expansion screw. This screw has the threaded end 15, the tapered body 16 and a shank portion formed with the head 17.

The threaded end 15 of the expansion screw is intended to have a threaded engagement with the threaded portion 12 of the opening 10 in the split end of the pilot member, and the tapered portion 16 of said expansion screw is adapted to have a wedging relation with the tapered portion 11 of the opening 10 in the pilot member, so that when the expansion screw is screwed up into the pilot member, it will spread the lower split end thereof, and when unscrewed, the spring in the lower split portions of the pilot member will permit them to return to their normal position. It is intended that the expansion screw shall always have a threaded engagement with the part of the threaded opening in the lower end of the pilot member, so as to be a part thereof.

18 designates a cutter holder in which is fitted preferably a bronze bushing 19, and the lower outer end of said holder is tapered as at 20. The upper end of the cutter holder has a hand-hold 21.

22 designates the cutter which is not unlike cutters in general use, except that it has an unequal number of cutting teeth 23. I have found by experience that when using a cutter with a uniform number of teeth, there is considerable "chatter" during the refacing or cutting operation, but that with an unequal number of teeth, this "chatter" is entirely obviated.

These cutters are of different diameter, as is understood, and I have provided the lower tapered end of the cutter holder, whereby the cutters of different sizes may be slipped on to the tapered end of the cutter holder so as to make the tool adaptable for refacing valve seats of different diameters. The bushing 19 in the cutter holder has a press fit therein so that it forms a part of the same.

The pilot member, or that portion which is adapted to be inserted into the valve stem guide, is made as near a standard size as possible, but it is found after an engine has seen service, there is always more or less play in these guides, due to poor lubrication, carbon and heat, so that there is not very much chance of a tool of this character fitting the guides, even though they may be worn only very slightly, and unless the fit of the pilot member in the guide is as near perfect as can possibly be obtained, there is likelihood that the cutter will cut on one side of the valve seat. With my improved construction of pilot member, this danger is entirely obviated.

In operation, or when making ready for refacing a valve seat, the first operation would be to remove the plugs in the top of the valve chambers (which are most generally directly over the valves), or in some engines the cylinder heads would have to be removed to permit the valve proper to be lifted out. After removing the valve proper, the pilot member is inserted through the valve chamber and into the valve stem guide, the same being lowered until the tapered portion 13 of said member rests on the upper end of the valve stem guide, as shown in Fig. 1. The expansion screw is then screwed into the lower end of the member until the split portions thereof are forced outwardly by the tapered portion 16 of the expansion screw, so as to firmly engage or impinge the inner wall of the opening in said valve stem guide. When this is accomplished, the pilot member is held snugly in the guide against rotation, and is properly centered so that the journal portion 7 of the pilot member is disposed in axial alinement through the opening, forming the valve seat in the valve chamber, substantially as shown in Fig. 1.

With the proper cutter 22 secured on the lower end of the cutter holder 18, said holder is passed down over the journal portion 7 of the pilot member until the cutting teeth are in contact with the valve seat surface to be refaced, when said holder may be rotated on the pilot member for refacing said seat.

What I claim is:

1. A tool for grinding a valve seat located in the metal of a cylinder head and rigidly alined with a smooth surfaced valve stem support, having in combination a rod, smooth surfaced from end to end, and adapted to be passed loosely through the valve seat from the engine side thereof and through a remote valve stem support, means co-acting with the smooth valve stem support for holding the rod rigidly longitudinally and laterally therein, with its journaled portion positioned in the transverse planes of the valve seat, and a rotary tool carrier loosely fitted to the rod and adapted to slip longitudinally thereon when in operation.

2. A tool of the character described, including in combination, a pilot member having one end of a smaller diameter than the other end, and separated by a tapered body portion, the smaller end of said member being split to adapt the same to be spread, and means adapted to have a threaded engagement with the split end of the member for spreading the same.

3. A tool of the character described, including in combination, a pilot member having one end split four ways and provided with an axially arranged opening tapered for a portion of its length, the remainder being threaded, an expansion screw for spreading the split end of the member, having a tapered body and a threaded end, and a cutter holder adapted to be rotated on the opposite end of said member.

4. A tool of the character described, including in combination, a pilot member having one end split four ways, its opposite end forming a journal and the two ends spaced by a tapered body and a threaded end, and a cutter holder adapted to be rotated on the opposite end of said member.

5. A tool for grinding a valve seat located in the metal of a cylinder head and rigidly alined with a remote valve stem support, it having in combination a rod which is smooth surfaced from end to end and adapted to be passed loosely through the valve seat from the engine side thereof and through the remote valve stem support, means securing the rod in the stem support and holding the journal part of the rod in transverse planes inside of the valve seat, a rotary cutter holder slidably and loosely mounted on the said journal part and formed with a downwardly narrowing tapered head, and a detachable cutter loosely engaging with said tapered head.

In witness whereof, I have hereunto affixed my hand this 25th day of June 1918.

LESTER R. VAN VOLKENBURG.